US 9,363,867 B2

(12) United States Patent
Mohan et al.

(10) Patent No.: US 9,363,867 B2
(45) Date of Patent: Jun. 7, 2016

(54) INTELLIGENT AND EMERGENCY LIGHT CONTROL

(75) Inventors: Tanuj Mohan, Mountain View, CA (US); David Perkins, Sunnyvale, CA (US); Premal Ashar, Sunnyvale, CA (US)

(73) Assignee: enLighted, Inc., Sunnyvale, CA (US)

( * ) Notice: Subject to any disclaimer, the term of this patent is extended or adjusted under 35 U.S.C. 154(b) by 955 days.

(21) Appl. No.: 13/238,223

(22) Filed: Sep. 21, 2011

(65) Prior Publication Data
US 2012/0326608 A1 Dec. 27, 2012

Related U.S. Application Data

(60) Provisional application No. 61/499,292, filed on Jun. 21, 2011.

(51) Int. Cl.
H05B 37/02 (2006.01)
H02J 9/06 (2006.01)

(52) U.S. Cl.
CPC ............ *H05B 37/0245* (2013.01); *H02J 9/065* (2013.01); *Y02B 20/40* (2013.01); *Y02B 20/48* (2013.01)

(58) Field of Classification Search
CPC ........... H05B 33/0854; H05B 37/0272; H05B 33/0842; H05B 37/02; H05B 37/0245; H05B 37/0263; H05B 37/03; H05B 37/032; H05B 37/04; H05B 41/2853; Y02B 20/48; Y02B 20/46; Y02B 20/42; Y02B 60/50
USPC .............. 315/160, 312–318, 86–87, 291, 149
See application file for complete search history.

(56) References Cited

U.S. PATENT DOCUMENTS

| | | | |
|---|---|---|---|
| 5,101,141 A | 3/1992 | Warner et al. | |
| 5,179,324 A | 1/1993 | Audbert | |
| 5,191,265 A | 3/1993 | D'Aleo et al. | |
| 5,283,516 A | 2/1994 | Lohoff | |
| 5,559,664 A * | 9/1996 | Dogul et al. ................. | 361/191 |
| 5,812,422 A | 9/1998 | Lyons | |
| 6,057,654 A | 5/2000 | Cousy et al. | |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 7,309,985 B2 | 12/2007 | Eggers et al. | |
| 7,348,736 B2 | 3/2008 | Piepgras et al. | |
| 7,382,271 B2 | 6/2008 | McFarland | |
| 7,437,596 B2 | 10/2008 | McFarland | |
| 7,550,931 B2 | 6/2009 | Lys et al. | |
| 7,566,137 B2 | 7/2009 | Veskovic | |
| 7,792,956 B2 | 9/2010 | Choong et al. | |
| 7,925,384 B2 | 4/2011 | Huizenga et al. | |
| 2004/0002792 A1 | 1/2004 | Hoffknecht | |
| 2005/0169643 A1 | 8/2005 | Franklin et al. | |
| 2006/0275040 A1 | 12/2006 | Franklin | |

(Continued)

*Primary Examiner* — Tuyet Vo
*Assistant Examiner* — Amy Yang
(74) *Attorney, Agent, or Firm* — Brian R. Short

(57) ABSTRACT

Methods, apparatuses and systems of an intelligent light controller controlling a light, are disclosed. One method includes interpreting a switch from a normal power supply to an emergency power supply. Upon interpreting the switch from the normal power supply to the emergency power supply, the intelligent light controller controllably powers the light for a predetermined period of time. Further, the intelligent light controller executes an energy-savings behavior control of the light.

15 Claims, 5 Drawing Sheets

(56) References Cited

U.S. PATENT DOCUMENTS

| | | |
|---|---|---|
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2008/0185977 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1 | 10/2010 | Chemal et al. |
| 2010/0270933 A1 | 10/2010 | Chemal et al. |
| 2010/0271802 A1* | 10/2010 | Recker et al. .................. 362/20 |
| 2010/0295482 A1 | 11/2010 | Chemal et al. |
| 2010/0301777 A1 | 12/2010 | Kraemer |
| 2011/0031897 A1 | 2/2011 | Henig et al. |
| 2011/0053492 A1 | 3/2011 | Hochstein |
| 2011/0062888 A1 | 3/2011 | Bondy et al. |
| 2011/0190952 A1 | 8/2011 | Goldstein |

* cited by examiner

```
┌─────────────────────────────────────────────┐
│   Rebooting a controller of the emergency light │
│                                             │
│                    410                      │
└─────────────────────────────────────────────┘
                       │
                       ▼
┌─────────────────────────────────────────────┐
│ Initiating, by the controller, communication with a non-emergency device; │
│                                             │
│                    420                      │
└─────────────────────────────────────────────┘
                       │
                       ▼
┌─────────────────────────────────────────────┐
│ Controlling the emergency light per an emergency mode if the communication with the non-emergency device is unsuccessful │
│                                             │
│                    430                      │
└─────────────────────────────────────────────┘
                       │
                       ▼
┌─────────────────────────────────────────────┐
│ Controlling the emergency light per a non-emergency mode if the communication with the non-emergency device is successful │
│                                             │
│                    440                      │
└─────────────────────────────────────────────┘
```

FIGURE 4

INTELLIGENT AND EMERGENCY LIGHT CONTROL

FIELD OF THE EMBODIMENTS

The described embodiments relate generally to lighting. More particularly, the described embodiments relate to intelligent and emergency light control.

BACKGROUND

The National Fire Protection Association has created a national standard (a code), which is "NFPA 101: Life Safety Code", that includes requirements for emergency lighting. State and local codes are derived from this standard. NFPA 101 specifies that emergency lighting provide enough illumination throughout the building so that the occupants can safely exit the building in the event of failure of normal power. The failures specified in section 7.9.2.3 of NFPA 101 are:

Failure of a public utility or other outside electrical power supply,

Opening of a circuit breaker or fuse,

Manual acts, including accidentally opening of a switch controlling normal lighting facilities.

Emergency lighting can be energized by emergency power or by a battery per emergency light fixture. There are tradeoffs as to which approach is used. These are primarily installation and component costs, ongoing maintenance costs, aesthetics, and compatibility with use.

A first implementation of emergency lighting includes a dedicated emergency light fixture connected to a circuit that supplies only "emergency power".

A second implementation of emergency lighting includes a dedicated emergency light fixture connected to a circuit that supplies only "normal power" when it is available, and "emergency power" when normal power fails. The circuit must contain a UL 1008 automatic transfer switch (ATS) that switches between the normal power and the emergency power feeds. The downside to this approach is that the light is continuously on, and a special circuit must be provisioned.

A third implementation includes a dual purpose light fixture that functions as a normal light and is controlled with an on/off switch when normal power is present and functions as an emergency light when emergency power is present (the setting of the on/off switch is ignored). This is similar to a dedicated fixture, in that it has a circuit that supplies "normal power" or "emergency power", but in addition, it has a UL 924 bypass (or shunt) switch so that when "normal power" is supplied, the light is user controllable with the on/off switch, and the on/off switch is bypassed (ignored) when "emergency power" is supplied. The cost of this approach is higher than the second implementation, due to the additional circuit and an UL 924 switch.

It is desirable to have a lighting method, system and apparatus for providing emergency lighting that also provides power conservation.

SUMMARY

One embodiment includes a method of an intelligent light controller controlling a light. The method includes interpreting a switch from a normal power supply to an emergency power supply. Upon interpreting the switch from the normal power supply to the emergency power supply, the intelligent light controller controllably powers the light for a predetermined period of time. Further, the intelligent light controller executes an energy-savings behavior control of the light.

Another embodiment includes an intelligent light apparatus. The intelligent light apparatus includes a light and a controller. Further, the controller is operative to interpret a switch from a normal power supply to an emergency power supply, control powering of the light for a predetermined period of time upon interpreting the switch from the normal power supply to the emergency power supply, and execute an energy-savings behavior control of the light.

Another embodiment includes a lighting system. The lighting system includes at least one emergency-designated intelligent light, and at least one non-emergency-designated device. Each emergency-designated intelligent light includes a light and a controller. The controller is operative to interpret a switch from a normal power supply to an emergency power supply, control powering of the light for a predetermined period of time upon interpreting the switch from the normal power supply to the emergency power supply, and execute an energy-savings behavior control of the light.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 is a flow chart that includes steps of another example of a method of an intelligent light controller controlling a light.

DETAILED DESCRIPTION

The described embodiments are embodied in methods, apparatuses and systems for controlling emergency lighting. The described embodiments include a intelligent light controller associated with a light fixture, which adjusts the light output based on a configuration (mode) for light fixture, measured ambient light and occupancy, day of the week, time of day, and holiday schedule, thereby providing intelligent light control. The described embodiments further include the intelligent light controller controlling the light fixture to behave as an emergency light (emergency mode) after, for example, a fluctuation of power to the fixture, and switching back to intelligent light control (what is called "auto" operation) after 90 minutes (or any other selectable time period), or shorter if it is determined not to be an emergency situation. Embodiments include various methods for interpreting a switch from normal power to emergency power, which put the intelligent light controller into the emergency light mode.

Emergency lighting is subject to state codes. For example, a California State code requires emergency lighting to be powered for a period of 90 minutes upon utility power being disabled. However, intelligent lighting systems being developed for reducing power consumption are not being developed for, and do not account for emergency backup lighting.

Figure 1:
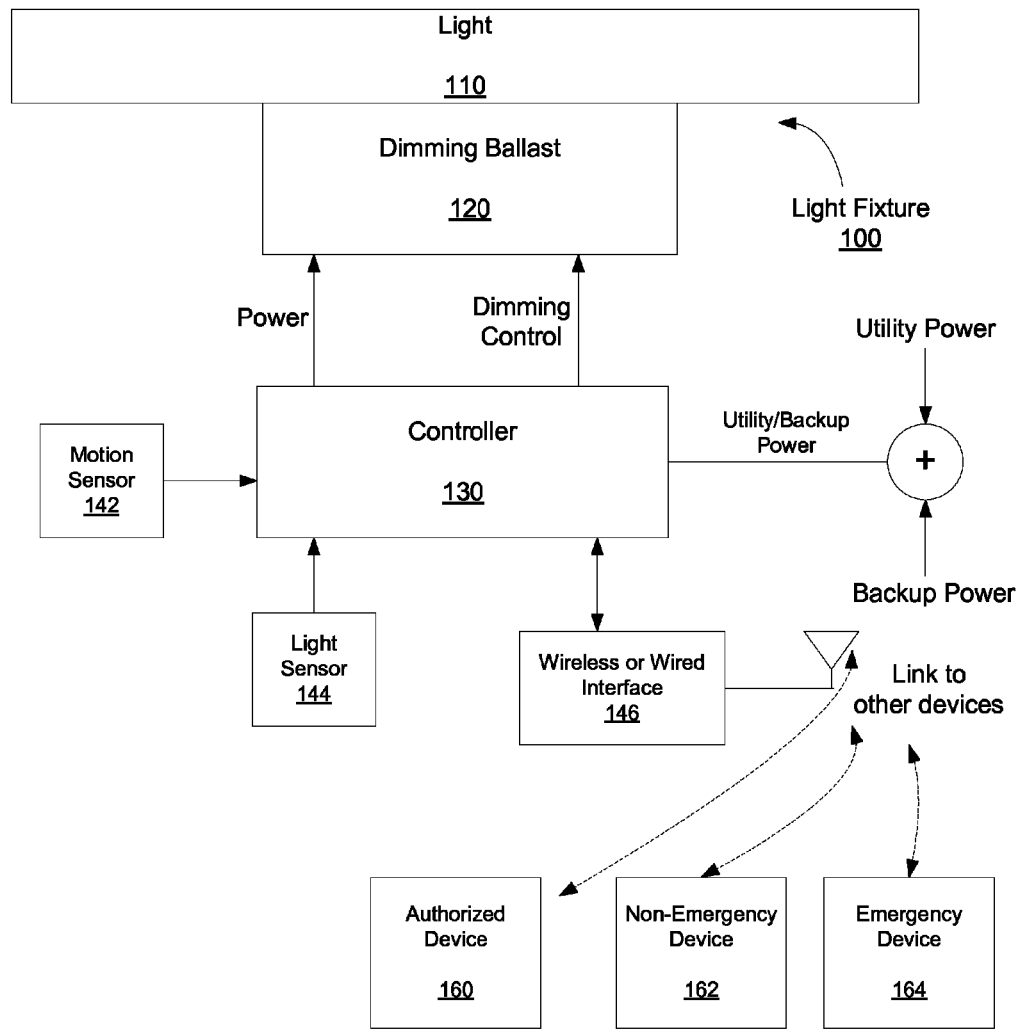
FIG. 1 shows an example of an intelligent light controller that provides emergency lighting control.

FIG. 1 shows an example of a light fixture 100. A controller 130 receives a supply voltage from either utility power or backup power. In some situations (such as, during an emergency) the utility power may fail. If the utility power fails, a backup power may be switched to provide a supply voltage to the light fixture 100. Embodiments of the light fixture 110 include the intelligent light controller 130 operating according to one of several possible modes (such as, an emergency mode, an energy-savings mode, a manual mode, or an ordinary light mode). For an embodiment, the intelligent light controller 130 operates in the emergency mode if the utility power is interpreted to have failed.

The controller 130 provides dimming and/or power control to a light 110 through a dimming ballast 120. The dimming ballast 120 receives a power input and a dimming control input, and provides a regulated current to the light 110.

For an embodiment, if the controller 130 interprets a switch from a normal power supply (such as, the utility power) to an emergency power supply (such as, the backup power) the intelligent light controller 130 powers the light 110 for a predetermined period of time. That is, based on the interpretation (detection or determination) of the switch from the normal power supply to the emergency power supply, the controller 130 puts the light into an emergency mode. For a specific embodiment, the predetermined period of time in which the light is powered is 90 minutes.

Once the predetermined period of time has lapsed, the intelligent light controller 130 initiates an energy-savings behavior control of the light. Additionally, if during the predetermined period of time, the intelligent light controller determines that an emergency condition does not really exist, the intelligent light controller can over-ride the emergency condition, and initiate the energy-savings behavior control of the light before the predetermined period of time has elapsed.

Several different methods can be used by the intelligent light controller 130 to interpret a switch from a normal power supply to an emergency power supply. For an embodiment, the intelligent light controller 130 interprets the switch due to the intelligent light controller 130 rebooting. In some situations, the switch from one power supply to another causes a voltage transient to the supply voltage of the intelligent light controller 130. The voltage transient can cause the intelligent light controller 130 to reboot. Therefore, upon rebooting, this embodiment includes the intelligent light controller 130 interpreting that a power supply switch has occurred. As will be described, the switch in voltage supplies can be confirmed by the intelligent light controller 130 communicating with other non-emergency devices. That is, if communication with a non-emergency device is successful, the intelligent light controller 130 may over-ride the interpreted emergency condition, and execute an energy savings mode.

Another method of the intelligent light controller 130 interpreting a switch from the normal power supply to the emergency power supply includes the intelligent light controller 130 receiving an indication of the switch from, for example, an authorized device 160. The authorized device 160 can be defined as a manager using any type of security authorization mechanism. Examples include "none"—that is, no authorization, access tokens, and authentication with access control list.

Another method of the intelligent light controller 130 interpreting a switch from the normal power supply to the emergency power supply includes the intelligent light controller 130 communicating with, for example, a non-emergency device 162. If the communication with the non-emergency device 162 fails, the intelligent light controller 130 interprets the failure as a switch from a normal power supply to an emergency power supply. The interpretation being that the non-emergency device 162 is powered by the utility power supply only, and the lack of being able to communicate with the non-emergency device 162 suggests that the non-emergency device 162 does not has power, and therefore, the utility power supply has failed, and the intelligent light controller 130 is being powered by the backup (emergency) power.

The intelligent light controller 130 communicates with other devices through a wireless or wired interface 146. The other devices include, for example, the authorized (manager) device 160, one or more non-emergency device, or other emergency devices 164.

As a part of the energy-savings mode of the intelligent light controller 130, the intelligent light controller 130 received inputs from sensors, such as, a motion sensor 142 and/or a light sensor 144. Clearly, other sensor can be utilized as well.

The light 110 can be a gas-discharge lamp, which is typically negative-resistance device. Such devices cannot effectively regulate their current use. If such a device were connected to a constant-voltage power supply, it would draw an increasing amount of current until it was destroyed or caused the power supply to fail. To prevent this, a ballast (such as the dimming ballast 120) provides a positive resistance that limits the ultimate current to an appropriate level. In this way, the ballast provides for the proper operation of the negative-resistance device by appearing to be a legitimate, stable resistance in the circuit.

Figure 2:
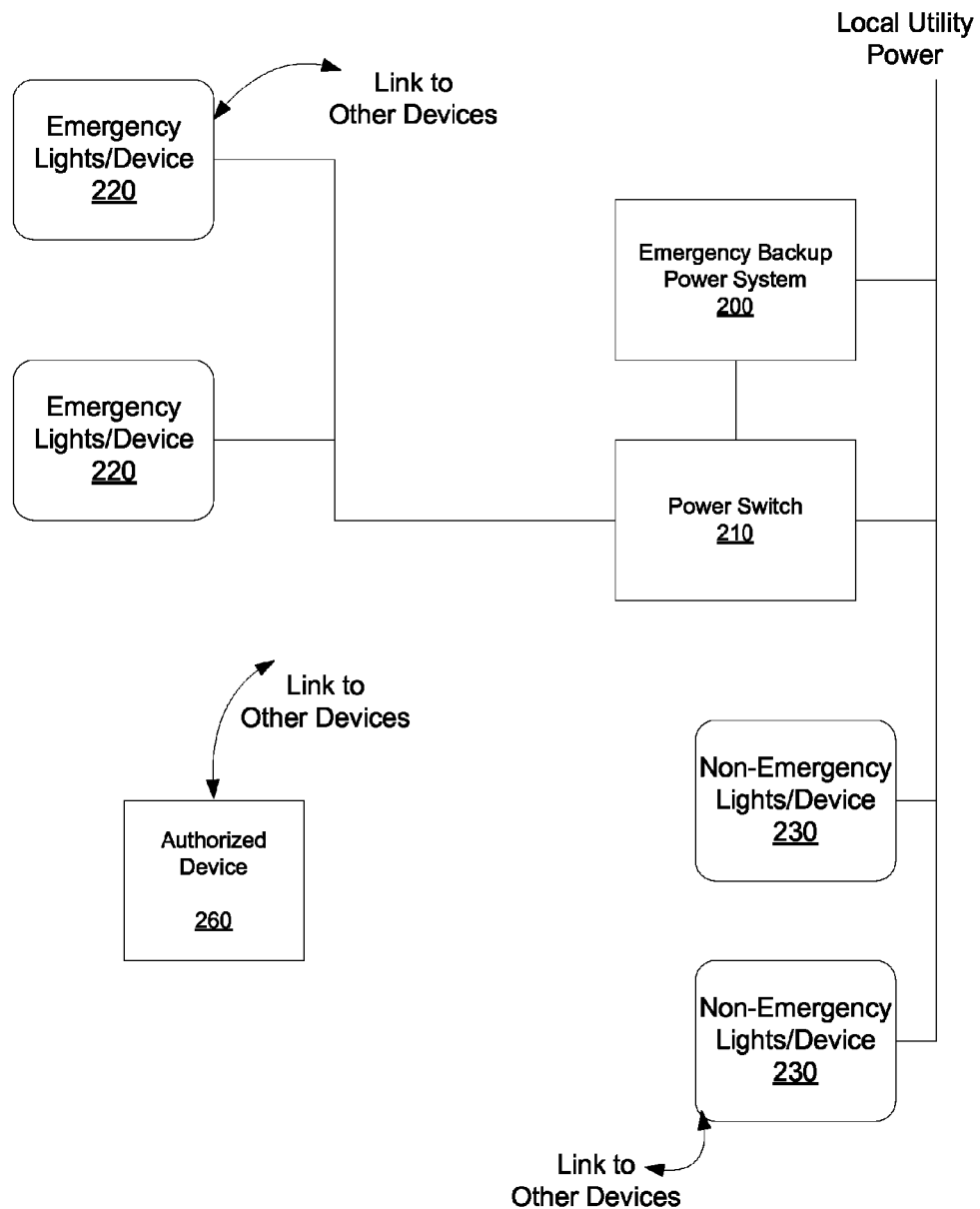
FIG. 2 shows an example of lighting system that includes several of the intelligent light controllers of FIG. 1.

FIG. 2 shows an example of lighting system that includes several of the intelligent emergency light controllers 220 of FIG. 1. As shown, local utility power is provided. A power switch 210 receives the local utility power and also receives emergency backup power from an emergency backup power system 200. The intelligent emergency light controllers 220 are connected to the power switch 220. Upon detection of the local utility power failing, the power switch 210 switches in the emergency backup power.

As shown, the non-emergency devices 230 are powered by the local utility power. Therefore, if the local utility power fails, the non-emergency devices will become non-operational. The intelligent emergency light controllers 220 can use the non-emergency devices 230 to determine or confirm that the local utility power has failed.

The emergency light controllers 220 are interfaced (wired or wirelessly) to the non-emergency devices 230 and to the authorized (managing) device 260. Through the interface, the emergency light controllers 220 can receive instructions from the authorized device 260, or initiate communications with the non-emergency devices 230.

For an embodiment, each emergency light controller 220 interprets a switch by the power switch 210 to emergency backup power due to a failure of communication to at least one of the non-emergency devices 230. For another embodiment, each emergency light controller 220 confirms a previously interpreted switch to emergency backup power by initiating communications with at least one of the non-emergency devices 230. If the communication is successful, then the emergency light controller 220 concludes that the regular local utility power is operational.

Figure 3:
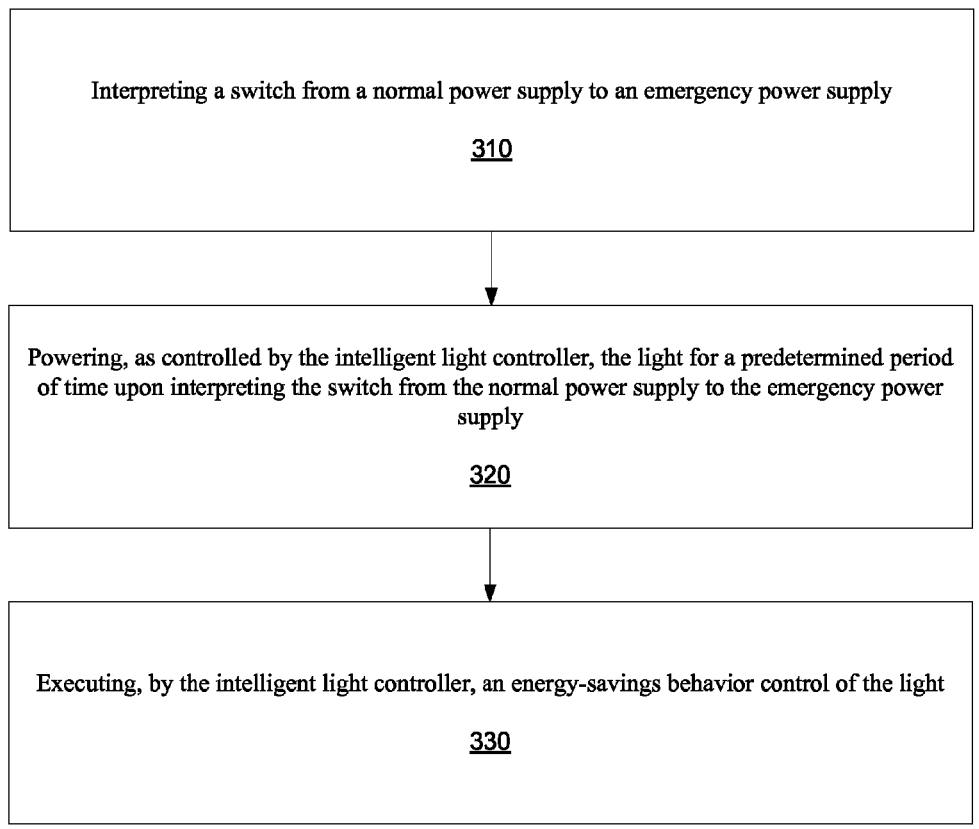
FIG. 3 is a flow chart that includes steps of an example of a method of an intelligent light controller controlling a light.

FIG. 3 is a flow chart that includes steps of an example of a method of an intelligent light controller controlling a light. A first step 310 includes interpreting a switch from a normal power supply to an emergency power supply. A second step 320 includes powering, as controlled by the intelligent light controller, the light for a predetermined period of time upon interpreting the switch from the normal power supply to the emergency power supply. A third step 330 includes executing, by the intelligent light controller, an energy-savings behavior control of the light.

Embodiments of the energy-savings behavior control of the light include sensing motion and reactively adjusting an intensity of the light based at least in part on the sensed motion. Embodiments of the energy-savings behavior control of the light include sensing surrounding light, and reactively adjusting the intensity of the light based at least in part on the sensed surrounding light. Embodiments of the energy-savings behavior control of the light include monitoring at least one of time, day, week, and reactively adjusting the intensity of the light based at least in part on the time, day, week, or a type of day. That is, the monitoring includes, for example, a schedule, that is based on time of day (for example, behavior during 9 am-10 am is different than from 7 pm to 8 pm); day of week (for example, behavior on a "week day" such as Monday-Friday, is different than a weekend day (such as Saturday and Sunday); and type of day (normal day, holiday (such as Monday September 5, which was labor day), closure day (such as June 20 to August 20 for elementary school).

For embodiments, the time and date are supplied (which can be a "battery-backed up real-time clock" (that is a clock that is part of the apparatus which retains time and date independent of the operational status of the device), or a relative clock that has a value that is initialized from another device and runs while the device is powered on.

The reactivity can be changed following a time-of-day schedule within a day of week schedule, which can be over-ridden by a special day schedule. For example, a reactivity schedule can be set up so that during non-working hours a light is completely turned off (when no one is present), but during working hours, a light is only dimmed to its lowest operational level when no one is present. Or, for example, the lights in the entry to an organization are set on to a bright level during working hours, and set to a dim level during non-working hours independently of motion and surrounding light.

Embodiments include various methods of interpreting the switch from the normal power supply to the emergency power supply. For an embodiment, interpreting the switch from the normal power supply to the emergency power supply includes a rebooting of the intelligent light controller. Rebooting of the intelligent light controller can indicate that a transient has occurred in the power supply to the intelligent light controller, which can indicate that a switch from the normal power supply to the emergency power supply has occurred.

An embodiment includes confirming the interpretation of the switch from the normal power supply to the emergency power supply including initiating, by the intelligent light controller, communication with a non-emergency device, and confirming the interpretation of the switch from the normal power supply to the emergency power supply, if the initiated communication is not successful.

For an embodiment, interpreting the switch from the normal power supply to the emergency power supply includes receiving an indication from a device that has control over the intelligent light controller. More specifically, the device includes an authorized device.

For an embodiment, interpreting the switch from the normal power supply to the emergency power supply includes initiating, by the intelligent light controller, communication with a non-emergency device, and interpreting the switch from the normal power supply to the emergency power supply, if the initiated communication is not successful.

An embodiment includes initiating, by the intelligent light controller, communication with a non-emergency device, and over-riding the powering of the light for the predetermined period of time if the initiated communication is successful during the predetermined period of time.

For an embodiment, the intelligent light controller includes multiple personality modes. Exemplary multiple modes include an emergency mode for when the intelligent light controller interprets a switch from a normal power supply to an emergency power supply, and an energy-savings mode for when the intelligent light controller is executing the energy-savings behavior control of the light.

Other modes include includes a manual mode, wherein the intelligent light controller can be given instructions to set the light intensity for a specified length of time, and an ordinary light mode. For an embodiment of the manual mode, the intensity of the light is set to a specific level by an authorized device for a specific duration. While in this mode, the intelligent light controller doesn't change the light level due to sensing motion or surrounding light, or the passing of time.

For embodiments, the light and intelligent light controller normally runs in one of three modes, including the energy-savings mode, the manual and the ordinary light bulb mode. The light and intelligent light controller can also be configured to check for a switch to/from emergency power, and when the switch to emergency power occurs, to then "act as an emergency light". However, when operating as an "ordinary light bulb" the light controller powers that light at maximum level, and doesn't change the light level due to sensing motion or surrounding light, or the passing of time.

Figure 5:
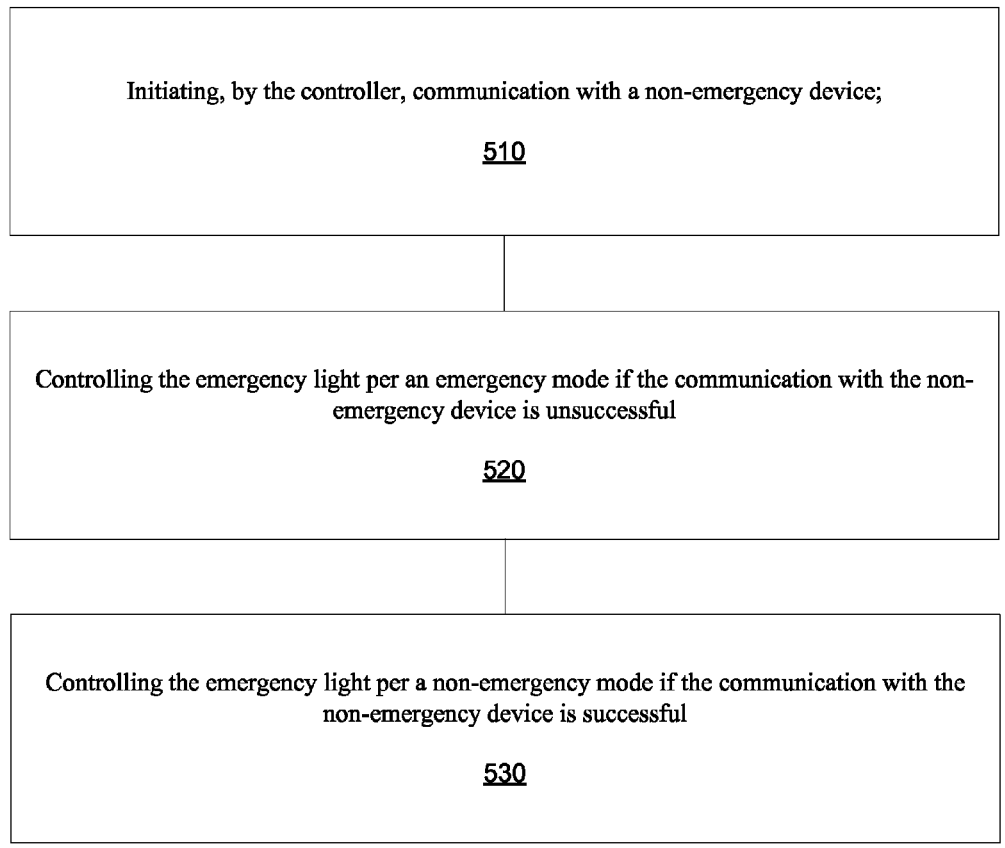
FIG. 5 is a flow chart that includes steps of another example of a method of an intelligent light controller controlling a light.

As previously described, the intelligent light controller can be put in the emergency mode if instructed by an authorized device. However, also as previously described, other embodiments include the intelligent light controller being put in the emergency mode if the intelligent light controller reboots, or if communication with a non-emergency device is unsuccessful. Accordingly, FIGS. 4 and 5 include steps of other examples of methods of an intelligent light controller controlling a light. FIG. 4 interprets a switch from a normal power supply to an emergency power supply which is then confirmed by initiating communication with a non-emergency device. FIG. 5 only includes interprets a switch from a normal power supply to an emergency power supply by initiating communication with a non-emergency device.

As shown in FIG. 4, a first step 410 includes rebooting a controller of the emergency light. A second step 420 includes initiating, by the controller, communication with a non-emergency device. A third step 430 includes controlling the emergency light per an emergency mode if the communication with the non-emergency device is unsuccessful. A fourth step 440 includes controlling the emergency light per a non-emergency mode if the communication with the non-emergency device is successful.

As shown in FIG. 5, a first step 510 includes initiating, by the controller, communication with a non-emergency device. A second step 520 includes controlling the emergency light per an emergency mode if the communication with the non-emergency device is unsuccessful. A third step 530 includes controlling the emergency light per a non-emergency mode if the communication with the non-emergency device is successful.

Another embodiment includes a program storage device readable by a machine, tangibly embodying a program of instructions executable by the machine to perform a method of an intelligent light controller controlling a light. The method performed includes interpreting a switch from a normal power supply to an emergency power supply, powering, as controlled by the intelligent light controller, the light for a predetermined period of time upon interpreting the switch from the normal power supply to the emergency power supply, and executing, by the intelligent light controller, an energy-savings behavior control of the light.

Although specific embodiments have been described and illustrated, the described embodiments are not to be limited to the specific forms or arrangements of parts so described and illustrated. The embodiments are limited only by the appended claims.

What is claimed:

1. A method of an intelligent light controller controlling a light, comprising:
continuously providing, by a power switch, power to the intelligent light controller from either a normal power supply or an emergency power supply, wherein the power switch switches to the emergency power supply upon detection of failing of the normal power supply;
detecting, by the intelligent light controller, a switch from the normal power supply to the emergency power supply by the power switch, comprising determining that the intelligent light controller has been rebooted;
powering, as controlled by the intelligent light controller, the light for a predetermined period of time after detecting the switch from the normal power supply to the emergency power supply by the power switch;
confirming the switch from the normal power supply to the emergency power supply by the power switch only after determining the intelligent light controller has been rebooted, comprising:
initiating, by the intelligent light controller, communication from the intelligent light controller to a non-emergency device after detecting the switch from the normal power supply to the emergency power supply;
confirming the detecting of the switch from the normal power supply to the emergency power supply when the communication initiated from the intelligent light controller to the non-emergency device is not successful;
over-riding the powering of the light for the predetermined period of time when the communication initiated from the intelligent light controller to the non-emergency device is successful during the predetermined period of time;
executing, by the intelligent light controller, an energy-savings behavior control of the light.

2. The method of claim 1, wherein the energy-savings behavior control of the light comprises:
sensing motion; and
reactively adjusting an intensity of the light based at least in part on the sensed motion.

3. The method of claim 1, wherein the energy-savings behavior control of the light comprises:
sensing surrounding light; and
reactively adjusting the intensity of the light based at least in part on the sensed surrounding light.

4. The method of claim 1, wherein the energy-savings behavior control of the light comprises:
monitoring at least one of a time, a day, a week, or a type of day; and
reactively adjusting the intensity of the light based at least in part on the time, day, week, or type of day.

5. The method of claim 1, wherein detecting the switch from the normal power supply to the emergency power supply further comprises receiving an indication from a device that has control over the intelligent light controller.

6. The method of claim 5, wherein the device comprises an authorized device.

7. The method of claim 1, wherein the intelligent light controller comprises multiple personality modes, comprising at least an emergency mode for when the intelligent light controller detects a switch from a normal power supply to an emergency power supply, and an energy-savings mode for when the intelligent light controller is executing the energy-savings behavior control of the light.

8. The method of claim 7, wherein the intelligent light controller additionally includes a manual mode, wherein the intelligent light controller can be given instructions to set the light intensity for a specified length of time.

9. The method of claim 7, wherein the intelligent light controller additionally includes an ordinary light mode.

10. An intelligent light apparatus, comprising:
a light;
a controller, the controller operative to:
detect a switch from a normal power supply to an emergency power supply received from a power switch, wherein the power switch is connected to the intelligent light controller and continuously provides power to the intelligent light apparatus from either the normal power supply or the emergency power supply, and wherein the power switch switches to the emergency power supply upon detection of failing of the normal power supply, comprising determining that the controller of the intelligent light apparatus has been rebooted;
control powering of the light for a predetermined period of time upon detecting the switch from the normal power supply to the emergency power supply;
confirm the switch from the normal power supply to the emergency power supply by the power switch only after determining the controller has been rebooted, comprising:
initiating, by the controller, communication from the intelligent light apparatus to a non-emergency device after the controller detects the switch from the normal power supply to the emergency power supply;
confirming the detecting of the switch from the normal power supply to the emergency power supply when the communication initiated from the intelligent light apparatus to the non-emergency device is not successful;
over-riding the powering of the light for the predetermined period of time when the communication initiated from the intelligent light apparatus to the non-emergency device is successful during the predetermined period of time; and
execute an energy-savings behavior control of the light.

11. The apparatus of claim 10, wherein the energy-savings behavior control of the light comprises:
at least one of a motion sensor sensing motion, a light sensor for sensing surrounding light, or a monitored time and date; and
the controller operative to reactively adjust an intensity of the light based at least one of the sensed motion, the sensed light, or the monitored time or date.

12. The apparatus of claim 10, wherein the controller detecting the switch from the normal power supply to the emergency power supply further comprises the controller receiving an indication from an authorized device that has control over the intelligent light controller.

13. The apparatus of claim 10, wherein the intelligent light apparatus comprises multiple personality modes, comprising at least an emergency mode for when the controller detects a switch from a normal power supply to an emergency power supply, an energy-savings mode for when the controller executes the energy-savings behavior control of the light, a manual mode for when the controller sets a fixed intensity of the light for a period of time.

14. A lighting system, comprising:
at least one emergency-designated intelligent light;
at least one non-emergency-designated device;
a power switch operative to continuously provide power to at least one emergency-designated intelligent light from either a normal power supply or an emergency power supply, wherein the power switch switches to the emergency power supply upon detection of failing of the normal power supply,
wherein the at least one emergency-designated intelligent light comprises;
a light;
a controller, the controller operative to:
  detect a switch from a normal power supply to an emergency power supply received from the power switch comprising determining that the at least one emergency-designated intelligent light has been rebooted;
  control powering of the at least one emergency-designated intelligent light for a predetermined period of time upon detecting the switch from the normal power supply to the emergency power supply;
  confirm the switch from the normal power supply to the emergency power supply by the power switch only after determining the at least one emergency-designated intelligent light has been rebooted, comprising:
    initiating, by the at least one emergency-designated intelligent light, communication from the at least one emergency-designated intelligent light to at least one of the plurality of non-emergency device after the at least one emergency-designated intelligent light detects the switch from the normal power supply to the emergency power supply;
    confirming the detecting of the switch from the normal power supply to the emergency power supply when the communication initiated from the at least one emergency-designated intelligent light to the at least one of the plurality of non-emergency device is not successful;
    over-riding the powering of the at least one emergency-designated intelligent light for the predetermined period of time when the communication initiated from the at least one emergency-designated intelligent light to the at least one of the plurality of non-emergency device is successful during the predetermined period of time; and
  execute an energy-savings behavior control of the at least one emergency-designated intelligent light.

15. The system of claim 14, wherein the controller detecting the switch from the normal power supply to the emergency power supply further comprises the controller receiving an indication from an authorized device that has control over the at least one emergency-designated intelligent light.

* * * * *